(12) United States Patent
Urakabe et al.

(10) Patent No.: US 7,075,271 B2
(45) Date of Patent: Jul. 11, 2006

(54) POWER CONTROLLING APPARATUS WITH POWER CONVERTING CIRCUIT

(75) Inventors: Takahiro Urakabe, Tokyo (JP); Tatsuya Okuda, Tokyo (JP); Takamasa Asai, Tokyo (JP); Sigetada Gotou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/950,133

(22) Filed: Sep. 27, 2004

(65) Prior Publication Data

US 2005/0105308 A1     May 19, 2005

(30) Foreign Application Priority Data

Sep. 29, 2003   (JP) .......................... P2003-336953

(51) Int. Cl.
*H02J 3/00*   (2006.01)
*H02M 5/45*   (2006.01)
*H02M 3/24*   (2006.01)
*H02H 7/06*   (2006.01)
*H02P 9/00*   (2006.01)

(52) U.S. Cl. .......................... 322/24; 322/28; 363/34; 363/37; 363/98

(58) Field of Classification Search .................. 322/24, 322/26, 28; 363/34, 98, 37
See application file for complete search history.

(56) References Cited

U.S. PATENT DOCUMENTS

| | | | | |
|---|---|---|---|---|
| 4,507,724 | A * | 3/1985 | Glennon | 363/98 |
| 5,280,421 | A * | 1/1994 | De Doncker et al. | 363/98 |
| 5,771,159 | A * | 6/1998 | Sako et al. | 363/17 |
| 5,838,558 | A * | 11/1998 | Tan et al. | 363/91 |
| 5,999,420 | A * | 12/1999 | Aonuma et al. | 363/21.06 |
| 6,067,237 | A * | 5/2000 | Nguyen | 363/17 |
| 6,194,885 | B1 * | 2/2001 | Oshima | 323/285 |
| 6,351,104 | B1 * | 2/2002 | Koelle et al. | 322/22 |
| 2001/0035562 | A1 * | 11/2001 | Kimura et al. | 257/532 |
| 2003/0141854 | A1 * | 7/2003 | Kuribayashi et al. | 322/28 |
| 2004/0085046 | A1 * | 5/2004 | Ye et al. | 322/13 |
| 2005/0040711 | A1 * | 2/2005 | West | 307/82 |

* cited by examiner

*Primary Examiner*—Nicholas Ponomarenko
*Assistant Examiner*—Julio C. Gonzalez
(74) *Attorney, Agent, or Firm*—Sughrue Mion, PLLC

(57) ABSTRACT

The invention provides an apparatus for bi-directional power conversion between a DC circuit and an AC circuit, which inexpensively and simply suppresses generation losses of elements and reduces heat generation, wherein a voltage obtained by dividing the U-phase voltage Vu is compared with a voltage obtained by dividing the voltage vpn of a DC circuit by a comparator CP1, and the MOSFET UFETh is turned on at the output timing thereof, and a voltage obtained by dividing the V-phase voltage Vv is compared with a voltage obtained by dividing the voltage Vpn of a DC circuit by a comparator CP2, and the MOSFET UFETh is turned off at the output timing thereof.

10 Claims, 14 Drawing Sheets

POWER CONTROLLING APPARATUS WITH POWER CONVERTING CIRCUIT

BACKGROUND OF THE INVENTION

1. Field of the Invention

The present invention relates to a power controlling apparatus provided with a power converting circuit for carrying out bi-directional power conversion between a DC circuit and an AC circuit, and particularly for attempting to lower the generation loss thereof.

In a prior art power controlling apparatus for power conversion between a DC power source and a motor/generator, for example, in Patent Document 1, an overheated state of a diode is detected by a thermistor when operating for power generation, and the power generation is stopped when the overheated state is continued for a specified period of time.

In order to lower a generation loss of a diode, for example, in Patent Document 2, there is a rectification device of an AC power generator, and a circuit in which a switching element is connected in parallel to the diode is disclosed.

Patent Document 1

Japanese Published Unexamined Patent Application No. H10-191691 (Refer to Paragraph Nos. 0025 through 0034)

Patent Document 2

Japanese Published Unexamined Patent Application No. H11-196577 (Refer to FIG. 3 and paragraph Nos. 0017 and 0036)

2. Description of the Prior Art

In the power controlling apparatus shown in Patent Document 1, if the temperature of a diode exceeds a specified threshold for a specified period of time when operating for power generation, it is necessary to stop power generation operation in order to prevent burnout due to overheating. Therefore, there was a problem in that power generation operation accompanying great power cannot be continued for a long period. That is, since the ON-voltage (forward direction voltage) of a diode operating for power generation is high, such a problem occurred, by which a loss in the diode is remarkable.

Also, in Patent Document 2, since a switching element is exclusively used for a power generation operation (rectification operation) although the generation loss of the diode is reduced by connecting the switching element in parallel thereto, such a problem existed, due to which the switching element is not applicable to a bidirectional converting apparatus which is an object of the present invention, that is, an apparatus capable of carrying out bidirectional conversion of an inverter operation for converting DC power to AC power and a rectification (power generation) operation for converting AC power to DC power.

The invention was developed to prevent the above-described problems and shortcomings, and it is therefore an object of the invention to provide a power controlling apparatus, capable of carrying out bidirectional power conversion between a DC circuit and an AC circuit, which inexpensively and simply reduces a generation loss of elements and lowers heat generation thereof.

SUMMARY OF THE INVENTION

A power controlling apparatus according to the invention is provided with a power converting circuit which is connected between a DC circuit and an AC circuit and composed of a switching element enabling power supply bidirectionally and a diode connected to the switching element in parallel thereto, and the same power converting apparatus that executes an inverter operation which, by controlling the switching element, DC power from the DC circuit is converted to AC power and is outputted to the AC circuit and a rectification operation which, by the diode, AC power from the AC circuit is converted to DC power and is outputted to the DC circuit, wherein the switching element connected in parallel to the diode is caused to supply power in the same direction as the corresponding diode in a period of time of power supply made by the diode in the rectification operation.

In the power controlling apparatus according to the invention, since a switching element that is originally in charge of switching control for an inverter operation and is not actuated in a rectification operation is devised to be provided with power in a power supply period of a diode in the rectification operation, it is possible to inexpensively lower the resistance of current channels and to reduce not only the loss of a diode but also a generation loss in a rectification operation without adding any new switching elements.

DESCRRIPTION OF THE PREFERRED EMBODIMENTS

Embodiment 1

Figure 1:
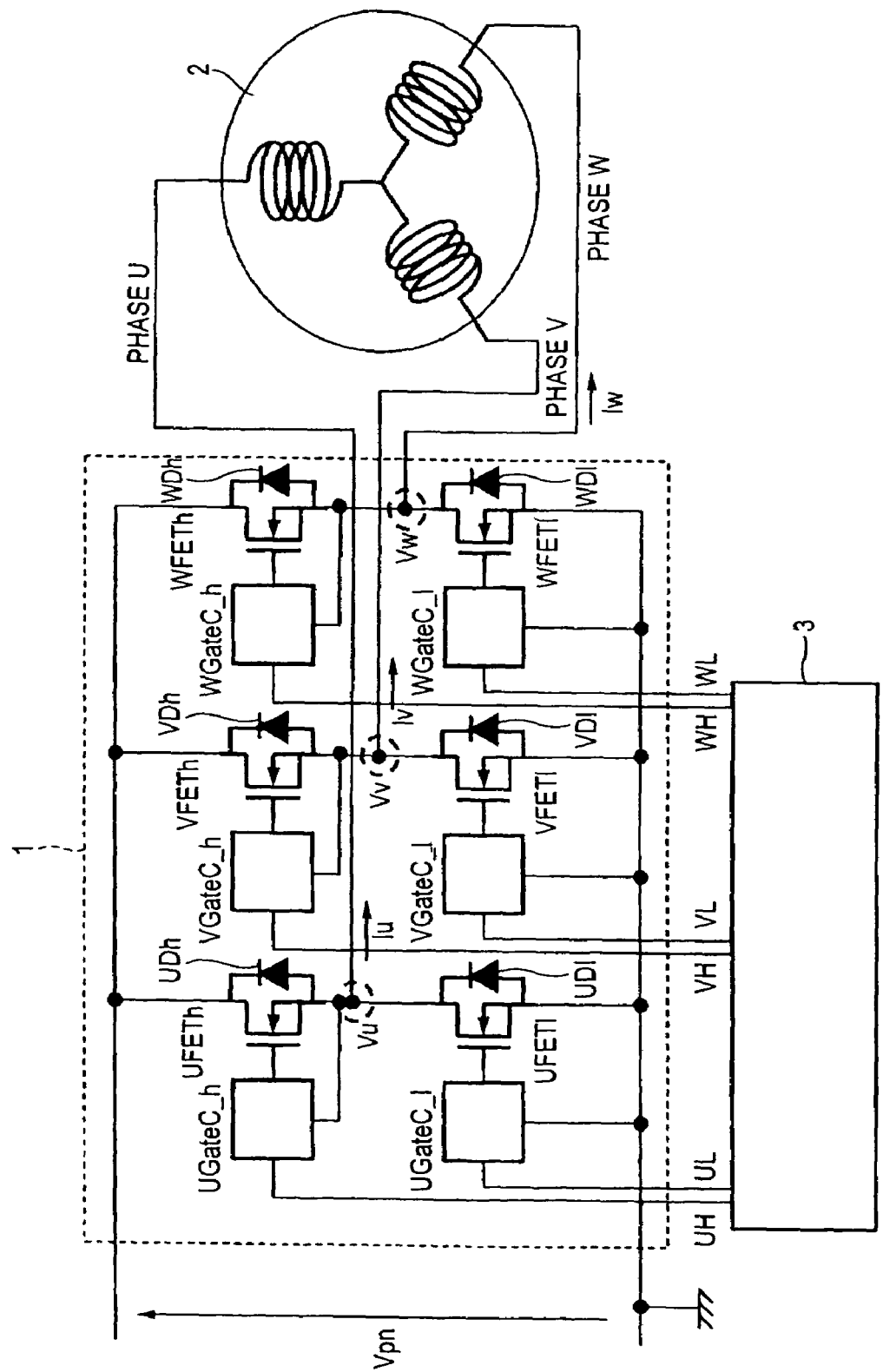
FIG. 1 is a main circuit diagram showing the entire configuration of a power controlling apparatus according to Embodiment 1 of the invention.

FIG. 1 shows the entire configuration of a power controlling apparatus according to Embodiment 1 of the invention. A three-phase power converting circuit 1 carries out a bidirectional power converting operation by a controlling circuit 3. Reference symbol Vpn denotes the DC voltage of a DC power source. The terminals are connected to an energy accumulation source such as a battery. A motor/generator 2, which is a power generation motor, shifts power from the energy accumulation source to the motor/generator 2 by carrying out an inverter operation of the power converting circuit 1, and the motor/generator 2 generates a rotational drive force to rotate axles, etc., (motor drive operation). Also, the motor/generator 2 is rotated by power given by the outside, wherein three-phase AC power is generated, and the generated AC power is rectified by the power converting circuit 1 and is charged into the energy accumulation source of a battery, etc.

(Power Generation Operation).

The power converting circuit 1 is an inverter of three phases UVW and is controlled by gate signals generated by a controlling circuit 3. The circuit for supplying U-phase power is composed of a power MOSFET UFETh for controlling connection of a high-potential line and the U-phase, a driver circuit UGateC_h for driving the MOSFET UFETh, a power MOSFET UFET1 for controlling connection of a low-potential line and the U-phase, a driver circuit UgateC_1 for driving the MOSFET UFET1, a diode UDh, connected to the MOSFET UFETh in parallel thereto, for forming a high-potential side switching circuit together with the MOSFET UFETh, and a diode UD1, connected to the MOSFET UFET1 in parallel thereto, for forming a low-potential side switching line together with the MOSFET UFET1.

Similarly, the V-phase circuit is composed of power MOSFETs VFETh and VFET1, driver circuits VGateC_h and VGateC_1, and diodes VDh and VD1. The W-phase circuit is composed of power MOSFETs WFETh and WFET1, driver circuits WGateC_hand WGateC_1, and diodes WDh and WD1. The above-described driver circuit carries out voltage-level conversion of voltage signals transmitted in accordance with the control GND reference and drive force amplification in order to drive the power MOSFET. In the present embodiment, the diodes UDh, UD1, VDh, VD1, WDh and WD1 are connected to respective power MOSFETs in parallel thereto. However, where parasitic diodes formed inside the MOSFETs are utilized, these diodes may not be separately disposed.

The scope described above is similar to a prior art power controlling apparatus. That is, by controlling the switching of the MOSFET that is a switching element, DC power from a DC power source is converted to AC power and is outputted to the motor/generator 2, and the motor/generator 2 receives the AC power, and it rotates and drives as an electric motor. In addition, AC power from the motor/generator 2 that operates as an electric motor is converted to DC power by diodes and is outputted to a DC power source.

Focusing attention on the latter operation, that is, a power generation operation (rectification operation) in which switching element are not normally used, the present invention is able to reduce a generation loss and heat generation of not only diodes but also switching elements by causing power to be supplied to the switching elements, which are not required for the rectification operation, for a period of power supply to the diodes and by dividing a current flown to the diodes to the switching elements.

That is, switching elements that are originally provided for an inverter operation are newly utilized for power generation operations in the invention, and no new switching elements are provided as a conversion circuit. Therefore, a lowering in generation losses of elements and heat generation can be simply and inexpensively achieved.

Figure 2:
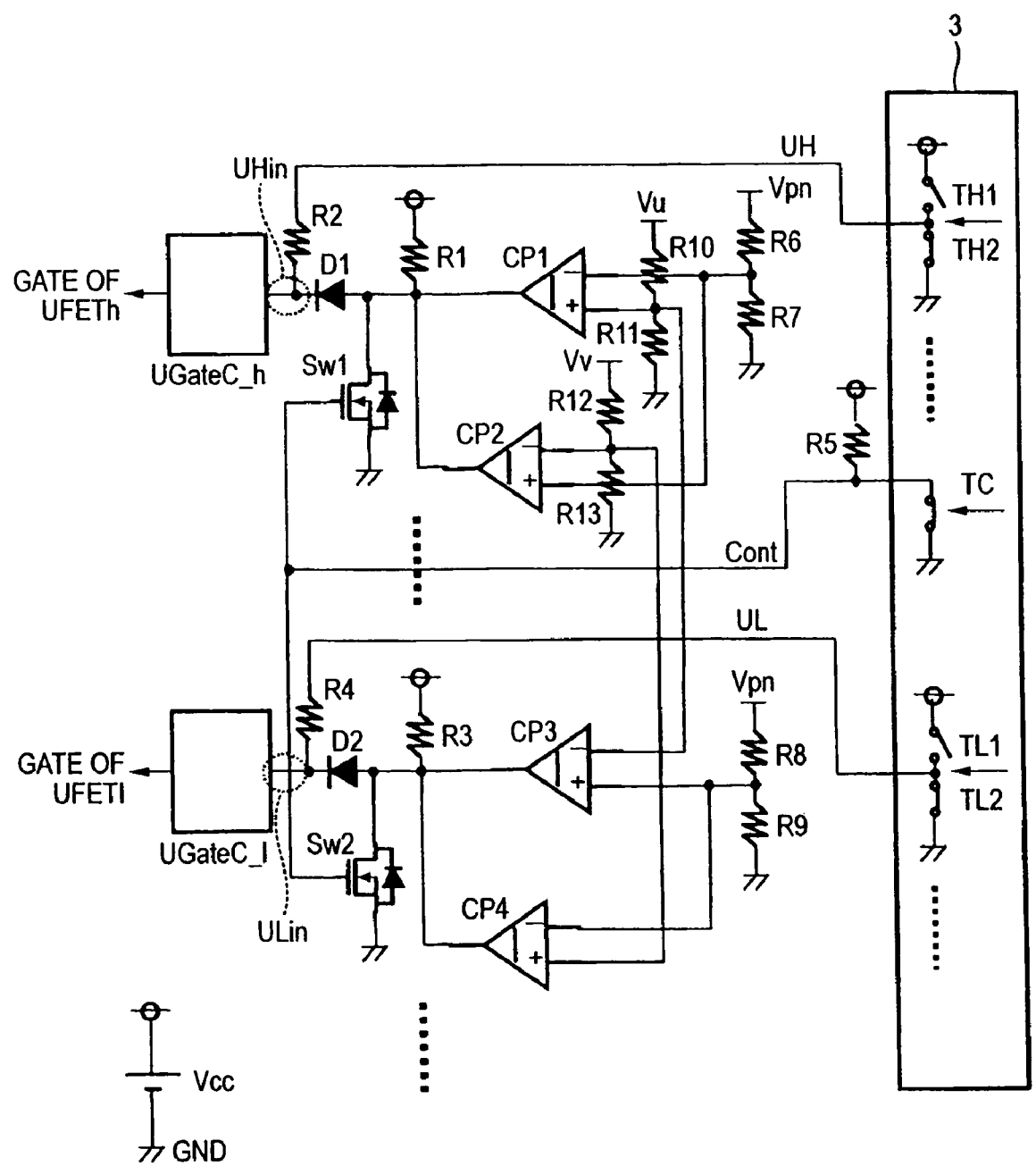
FIG. 2 is a view showing a synchronization rectification signal generating circuit according to Embodiment 1.

Next, FIG. 2 shows a construction centering around a synchronization rectification signal generating circuit, which is the main part of Embodiment 1 of the invention, that is, a circuit for generating signals to control the switching of the MOSFET in order to reduce the current flowing through diodes in power generation operations. Only the U-phase construction is shown therein. The controlling circuit 3 is a microcomputer and operates on the basis of control GND reference. The controlling circuit output line UH is connected to an input terminal UHin of the driver circuit UGateC_h via a resistor R2, and the input terminal UHin of the driver circuit UGateC_h is connected to the cathode of the diode D1 while the anode of the diode D1 is connected to the power terminal Vcc of the control GND reference, output terminals of comparators CP1 and CP2, and drain of the MOSFETSw 1 via a resistor R1.

The controlling circuit output line UL is connected to the input terminal ULin of the driver circuit UGateC_1 via a resistor R4, and the input terminal ULin of the driver circuit UGateC_1 is connected to the cathode of the diode D2 while the anode of the diode D2 is connected to the power terminal Vcc, output terminals of comparators CP3 and CP4 and drain of the MOSFETSw2 via a resistor R3.

Voltage Vpn×R7/(R6+R7) which is obtained by dividing the voltage Vpn by resistors R6 and R7 is inputted into the negative input terminal of the comparator CP1 and the positive input terminal of the comparator CP2. Voltage Vu×R11/(R10+R11) which is obtained by dividing the U-phase voltage Vu by resistors R10 and R11 is inputted into the positive input terminal of the comparator CP1 and the negative input terminal of the comparator CP3. Voltage Vv×R13/(R12+R13) which is obtained by dividing the V-phase voltage Vv by resistors R12 and R13 is inputted into the negative input terminal of the comparator CP2 and the positive input terminal of the comparator CP4. Also, Voltage Vpn×R9/(R8+R9) which is obtained by dividing the voltage Vpn by resistors R8 and R9 is inputted into the positive input terminal of the comparator CP3 and the negative input terminal of the comparator CP4.

The voltage Vpn×R7/(R6+R7) is set to a value smaller by 0.5V through 1V than the maximum value of the voltage Vu×R11/(R10+R11), and the voltage VPn×R9/(R8+R9) is set to a value larger by 0.5V through 1V than the minimum value of the voltage Vu×R11/(R10+R11).

Source terminals of the switches Sw1 and Sw2 are connected to the control GND, and the gate terminal is connected to a Cont terminal of the controlling circuit 3. The control lines UH and UL are connected to the UH and UL terminals of the controlling circuit 3. The driver circuits UGateC_h and UGateC_1 shift the level of signals inputted into UHin and ULin in order to drive the power MOSFETs UFETh and UFET1, and the drive performance is increased, wherein drive signals are transmitted to the gate of the power MOSFET. The Cont terminal of the controlling circuit 3 is connected to the power source Vcc via a resistor R5 and is connected to the control GND via a switch in the controlling circuit 3.

A description is given of roles of the Cont terminal. When the motor is driven (the power converting circuit 1 makes an inverter operation), the switches TC, TH2, and TL2 in the controlling circuit 3 are turned off, and a high-impedance state is brought about between the Cont terminal and GND. The voltage of the signal Cont line is made into voltage Vcc of the power source terminal. If the Cont line reaches voltage Vcc, the gates of the switches Sw1 and Sw2 are made into HIGH voltage and the ON-state is brought about. The anode terminal voltage of the diodes D1 and D2 is set to the GND(zero) voltage. As a result, even if comparators CP1 through CP4 described later operate in any state, the input terminals UHin and ULin of the driver circuit are not influenced since the anode terminal voltages of the diodes D1 and D2 are GND voltage.

And, when the motor drives, the switches TH1, TH2, TL1 and TL2 in the controlling circuit 3 carries out ON and OFF operations on the basis of PWM motor control, wherein UH and UL signals are transmitted to the input terminals UHin and ULin of the driver circuit as they are, and the power converting circuit 1 generates desired AC voltage, and the motor is driven.

Next, a description is given of operations when generating power. When power is generated, the switches TC, TH2 and TL2 in the controlling circuit 3 are all turned on as illustrated. The switches Sw1 and Sw2 are all turned off. Therefore, signals formed by the comparators CP1, CP2 and CP3, CP4 are transmitted to the input terminals UHin and ULin of the driver circuits UGateC_h and UGateC_1 as they are.

Figure 3:
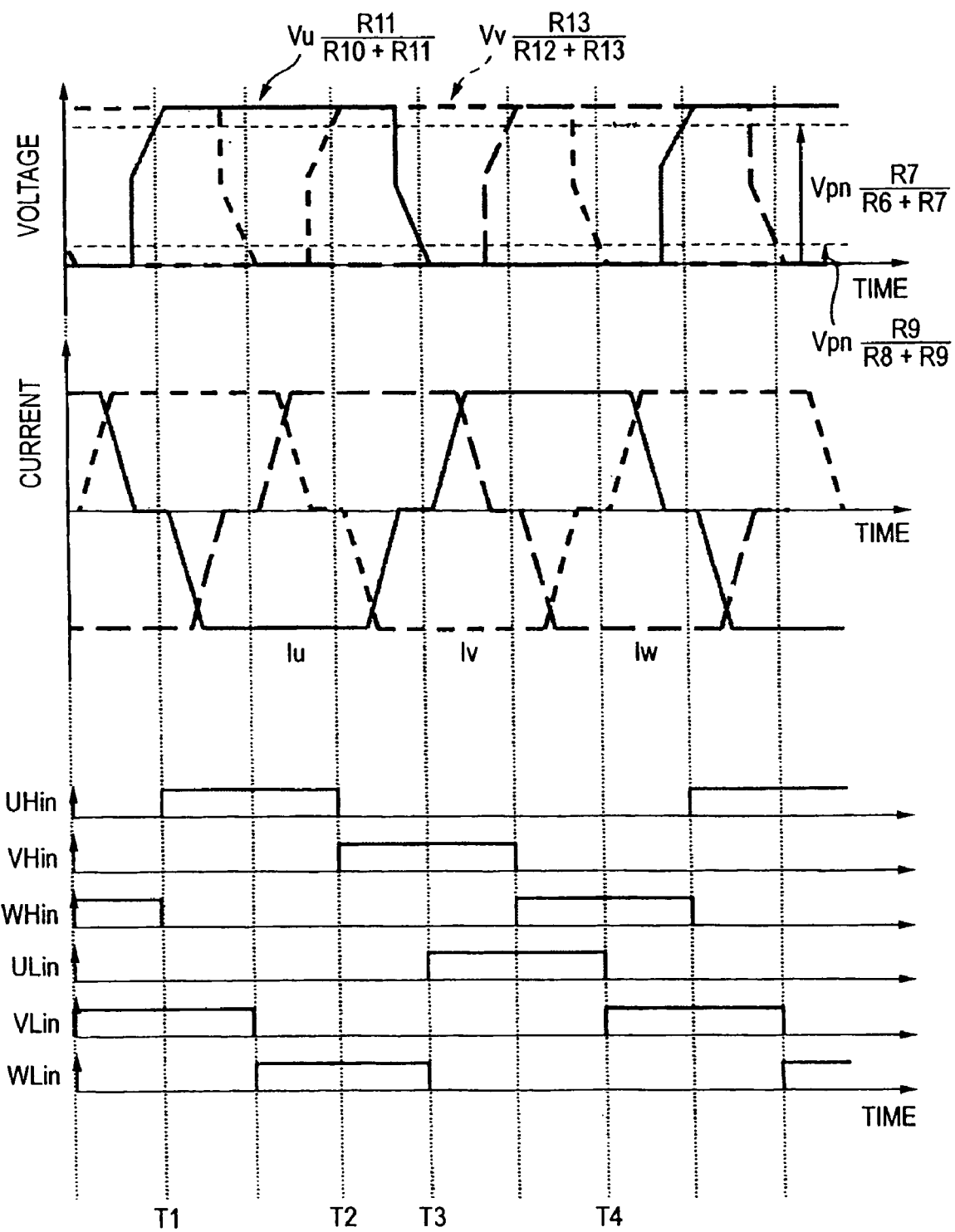
FIG. 3 is a waveform diagram for describing actions of Embodiment 1.

FIG. 3 shows detection voltages Vu×R11/(R10+R11) and Vv×R13/(R12+R13) of U, V, and W phases, currents of U, V and W phases, and voltages of inputs UHin, ULin, VHin, VLin, WHin and WLin of the driver circuits UGateC_h, UGateC_1, VGateC_h, VGateC_1, WGateC_h, and WGateC_1. As for the current, the flowing direction of current from the power converting circuit 1 to the motor/generator 2 is made positive as shown in FIG. 1.

First, a description is given of operations of the power MOSFET UFETh. The current flowing direction of the U-phase current Iu is changed from positive to negative, the U-phase voltage is boosted from approximately −1V to approximately vpn+1V. The diode UDh is kept conductive for the period of time during which the U-phase voltage is more than the voltage Vpn. When the U-phase detection voltage Vu×R11/(R10+R11) exceeds the comparison voltage Vpn×R7/(R6+R7) (Time T1), the output of the comparator CP1 operating as the first detecting means becomes HIGH voltage, and the voltage obtained by dividing the voltage Vcc by resistors R1 and R2 is inputted into the input terminal UHin of the driver circuit UGateC_h. The driver circuit UGateC_h recognizes the voltage as HIGH voltage, HIGH voltage is outputted to the gate of the power MOSFET UFETh, and the power MOSFET UFETh is turned on. At this time, the current flowing into the diode UDh also flows into the MOSFET UFETh.

Next, the current flowing direction of the V-phase current Iv is changed from positive to negative. The V-phase voltage is boosted from approximately −1V to approximately Vpn+1V and a current flows into the diode VDh as well. When the V-phase detection voltage Vv×R13/(R12+R13) exceeds the comparison voltage Vpn×R7/(R6+R7) (Time T2), the output of the comparator CP2 operating as the second detecting means becomes a LOW voltage, wherein LOW voltage is outputted to the gate of the power MOSFET UFETh, and the power MOSFET UFETh is turned off. At this time, although the power MOSFET FETh is turned off, the U-phase current Iu is continuously flown through the diode UDh.

A description is given of operations of the power MOSFET UFET1. If the current flowing direction of the U-phase current is changed from negative to positive, the U-phase voltage Iu is lowered from approximately Vpn+1V to approximately—1V. The diode UD1 is made conductive for a period during which the U-phase voltage becomes less than 0V. When the U-phase detection voltage Vu×R11/(R10+R11) is lowered from the comparison voltage Vpn×R9/(R8+R9) (Time T3), the output of the comparator CP3 operating as the first detecting means becomes HIGH voltage, and voltage obtained by dividing the voltage Vcc by resistors R3 and R4 is inputted into the input terminal ULin of the driver circuit UGateC_1. The driver circuit UGateC_1 recognizes the voltage as HIGH voltage, and HIGH voltage is outputted to the gate of the power MOSFET UFET1, and the power MOSFET UFET1 is turned on. At this time, the current flowing into the diode UD1 also flows into the power MOSFET UFET1.

Next, the current flowing direction of the V-phase current Iv is changed from negative to positive. The V-phase_voltage is lowered from approximately Vpn+1V to approximately −1V, and a current begins flowing to the diode D1. When the V-phase detection voltage Vv×R13/(R12+R13) is lowered from the comparison voltage Vpn×R9/(R8+R9) (Time T4), the output of the comparator CP4 operating as the second detecting means becomes LOW voltage. The LOW voltage is outputted to the gate of the power MOSFET UFET1, and the power MOSFET UFET1 is turned off. At this time, although the power MOSFET FEt1 is turned off, the U-phase current Iu is continuously flowing through the diode UD1.

In the power controlling apparatus, a current flows into the diodes for one half cycle of one cycle of the current. In the present invention, the MOSFET is turned on for one-third cycle of one cycle of the current, that is, two-thirds the continuity period of the diode. By turning on the MOSFET and making the resistance of the current flowing channel lower when the diode is in continuity, power loss due to the current can be suppressed, and heat generation can be also suppressed.

Figure 4:
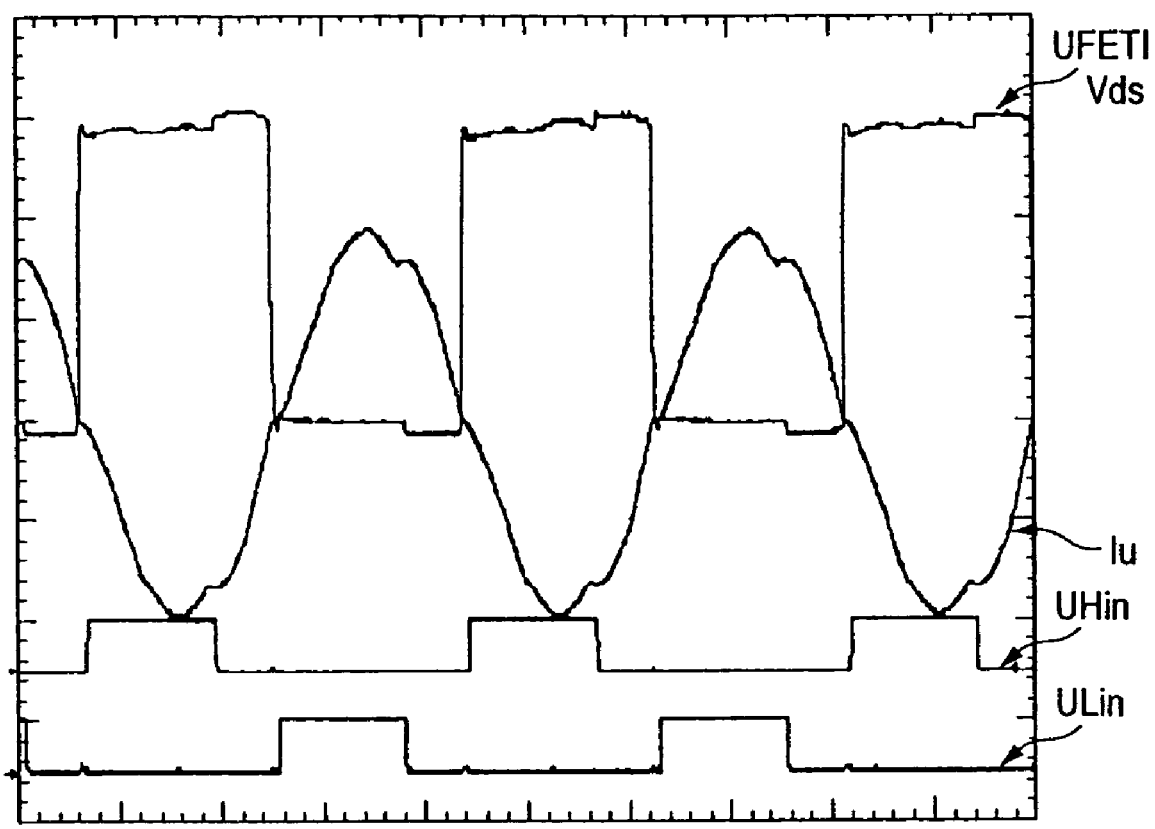
FIG. 4 is a diagram showing results of observation of waveforms.

FIG. 4 shows observation results in the waveform. Herein, voltage Vds between the drain and source of MOSFET UFET1 is taken as an example for description. However, the MOSFET UFEt1 is turned on for the period during which the input ULin to the driver circuit UGateC_1 is HIGH, and the voltage Vds becomes almost zero for this period. Therefore, it is understood that the generation loss of elements are greatly lowered.

Also, although the above description deals with only the U-phase construction. This is the same in connection with the V-phase and W-phase. The power MOSFET is turned on in accordance with diode continuity by detecting the voltage of a self phase, and the voltage of the other phase whose phase angle is delayed by (⅔)π (that is, V-phase if the self phase is U-phase, W-phase if the self phase is V-phase, and U-phase if the self phase is W-phase) is detected, and the power MOSFET is turned off.

As described above, Embodiment 1 according to the invention is provided with the first detecting means for detecting the voltages of respective phases of a three-phase AC circuit and the voltage of a DC circuit and for detecting the power supply commencement timing of respective diodes by comparison operations on the basis of these voltage detection values, wherein since a switching element connected to the corresponding diode in parallel thereto is turned on at the power supply commencement timing detected by the first detecting means, it is possible to securely turn on the switching element in accordance with the power supply commencement timing of a diode to which the switching element is connected in parallel thereto even if a fluctuation occurs in the absolute value and frequency of the voltage of the circuit.

In addition, the embodiment is provided with the second detecting means for detecting the voltage of the next phase whose phase angle is delayed by (2/3) from a specified phase in which a switching element is turned on and for detecting the power supply commencement timing of a diode of the next phase by comparison operations on the basis of these voltage detection values, wherein since the switching element of the corresponding phase is turned off at the power supply commencement timing detected by the second detecting means, it is possible to securely supply power for the period of power supply of a diode to which the switching element is connected in parallel thereto even if a fluctuation occurs in the absolute value and frequency of the voltage of the circuit.

Embodiment 2

Figure 5:
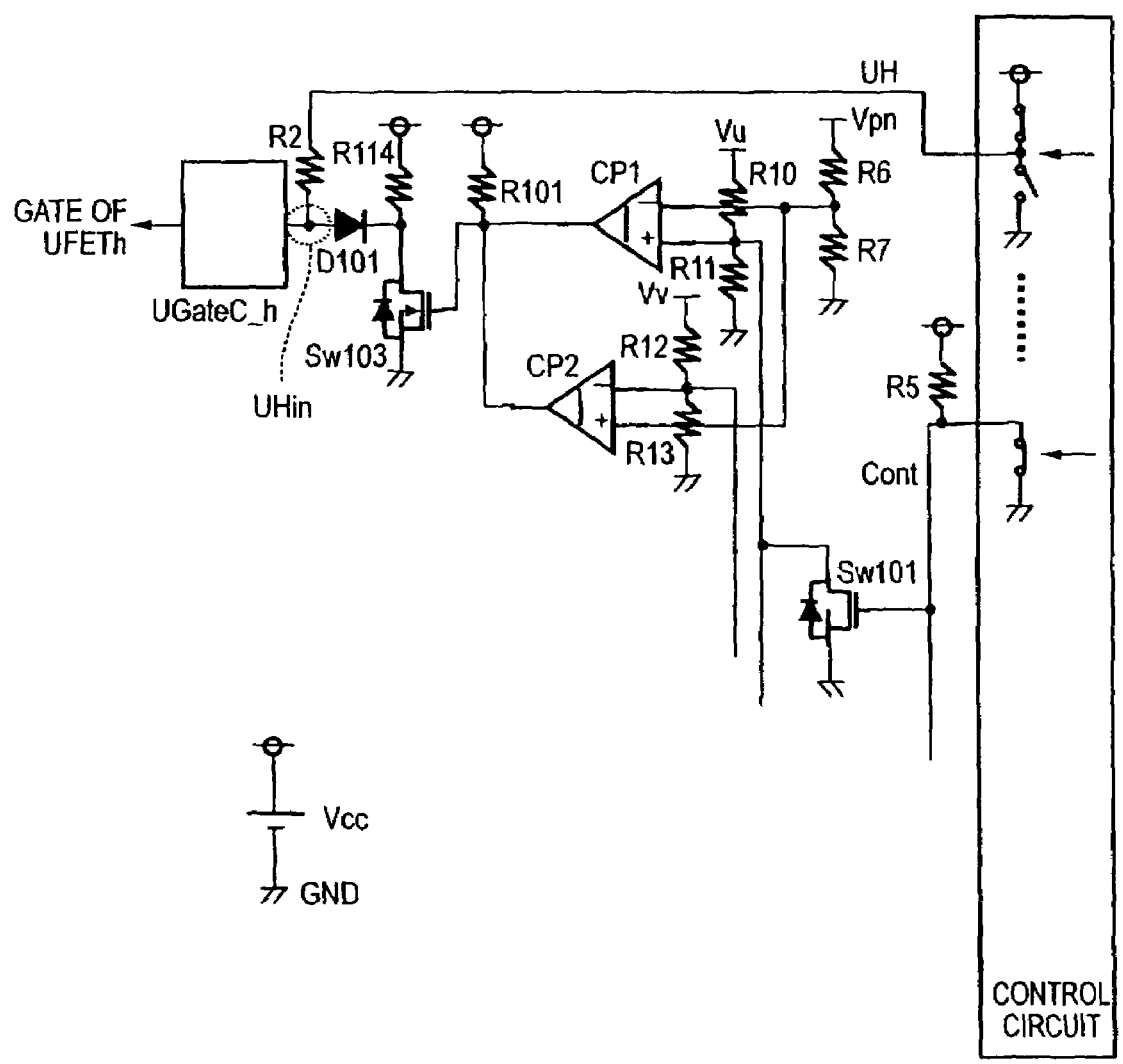
FIG. 5 is a view showing a synchronization rectification signal generating circuit of a power controlling apparatus according to Embodiment 2 of the invention, with a part thereof omitted.

In the preceding Embodiment 1, although a description was given of a circuit configuration in the case where the input of the driver circuit is HIGH ACTIVE (HIGH voltage, and HIGH voltage is supplied to the gate of the power MOSFET). In Embodiment 2, a description is given of a circuit configuration in the case where the input of the driver circuit is LOW ACTIVE (with LOW voltage, and HIGH voltage is supplied to the gate of the power MOSFET). FIG. 5 shows a high-potential side of U-phase. Even if the input to the driver circuit is LOW ACTIVE, it is a matter of course that the low-potential side and other phases have the same construction.

Connections of the comparators CP1 and CP2 and resistors R5, R6, R7, R10, R11, R12 and R13 are the same as those in Embodiment 1. Output terminals of the comparators CP1 and CP2 are connected to the gates of the power source Vcc and switch Sw103 via a resistor R101. The source of the switch Sw103 is connected to the GND, and the drain thereof is connected to the power source Vcc via a resistor R114 and to the cathode terminal of a diode D101. The anode terminal of the diode D101 is connected to the controlling circuit terminal UH via the resistor R2, and is further connected to the input terminal UHin of the driver circuit UGateC_h.

The controlling circuit terminal Cont to make invalid the actions of the synchronization rectification signal generating circuit is connected to the gate of the switch Sw101 when the motor drives. The source of the switch Sw101 is connected to the GND, and the drain thereof is connected to the positive input terminal of the comparator CP1. The low-potential side switch is connected to the positive input terminal of the comparator CP4.

When the motor drives, the Cont terminal is made into a high impedance state in the controlling circuit 3. Therefore, by the switch Sw101 being turned on, the output terminal of the comparator CP1 is made into GND voltage, wherein the switch Sw103 is turned off, and the cathode voltage of the diode D101 is made into Vcc at all times. As a result, even if the voltages Vu and Vv change, no influence is given to the motor driving pulse generated in the driver circuit input UHin. This is the same at the low-potential side. In power generation, the controlling circuit terminal Cont is connected to the GND in the controlling circuit 3, and the switch Sw101 is turned off, wherein the synchronization rectification signal generating circuit is operated. In the power generation, the controlling circuit output UH is fixed at the Vcc voltage.

The actions are basically the same as those in Embodiment 1. That is, as described above, the U-phase and V-phase voltages are compared with the reference voltage, and a rectangular voltage waveform comes out as the output of the comparator. The switch Sw103 is operated by this rectangular voltage waveform. When the comparator output is a HIGH voltage, the input terminal UHin of the driver circuit UGateC_h becomes a LOW voltage, and when the former output is LOW voltage, the input terminal UHin of the driver circuit UGateC_h becomes a HIGH voltage. The actions at the low-potential side and in the other phases become the same as above.

Embodiment 3

In the above-described Embodiments 1 and 2, a description was given of that, in the continuity period of the diode, the ON period of the power MOSFET is a ratio of two-thirds the entire continuity period of the diode. If the ON-period is made longer, it is possible to suppress heat generation in the elements. In the present Embodiment 3, a description is given of a circuit configuration and actions for making the ON period longer.

Figure 6:
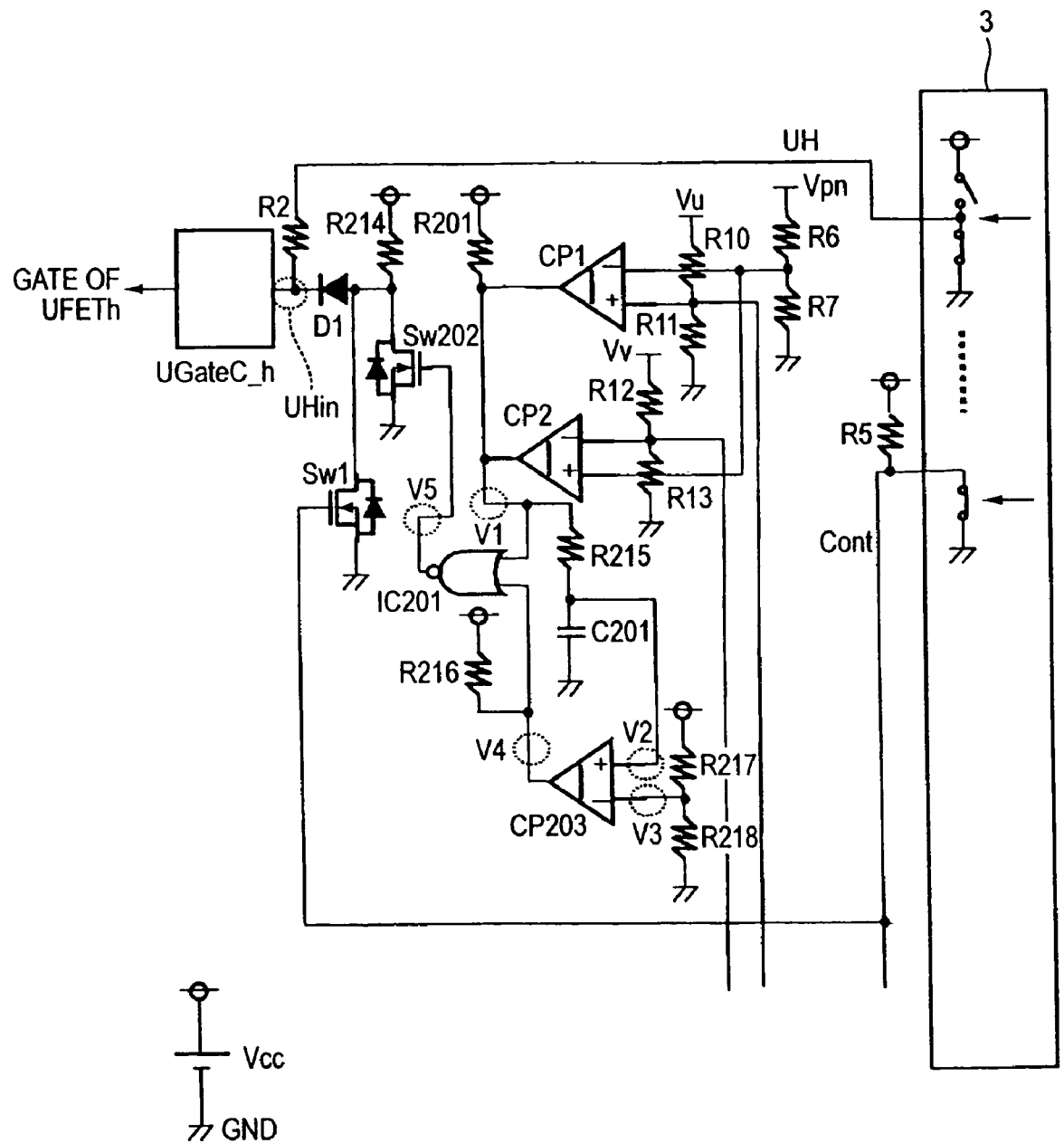
FIG. 6 is a view showing a synchronization rectification signal generating circuit of a power controlling apparatus according to Embodiment 3 of the invention, with a part thereof omitted.

FIG. 6 shows a construction of Embodiment 3, which shows a construction of only the U-phase high-potential side. The constructions at the low-potential side and in the other phases are the same. Connections of the comparators CP1 and CP2 and resistors R2, R5, R6, R7, R10, R11, R12, and R13, switch Sw1 and diode D1 are the same as those in Embodiment 1.

The output terminals of the comparators CP1 and CP2 are connected to the power Vcc via a resistor R201, and connected to one input terminal of the NOR circuit IC201 and the resistor R215. The other input terminal of the NOR circuit IC201 is connected to the power source Vcc via a resistor R216 and to the output terminal of the comparator CP203. Another terminal of the resistor R215 is connected to a capacitor C201 and to the positive input terminal of the comparator CP203. Another terminal of the capacitor C201 is connected to the GND. Voltage obtained by dividing the voltage by means of the resistors R218 and R218 is inputted into the negative input terminal of the comparator CP203. The output terminal of the NOR circuit IC201 is connected to the gate of the switch Sw202, and the source of the switch Sw202 is connected to the GND. The drain thereof is connected to the power source Vcc via the resistor R214, the drain of the switch Sw1 and the anode of the diode D1.

Figure 7:
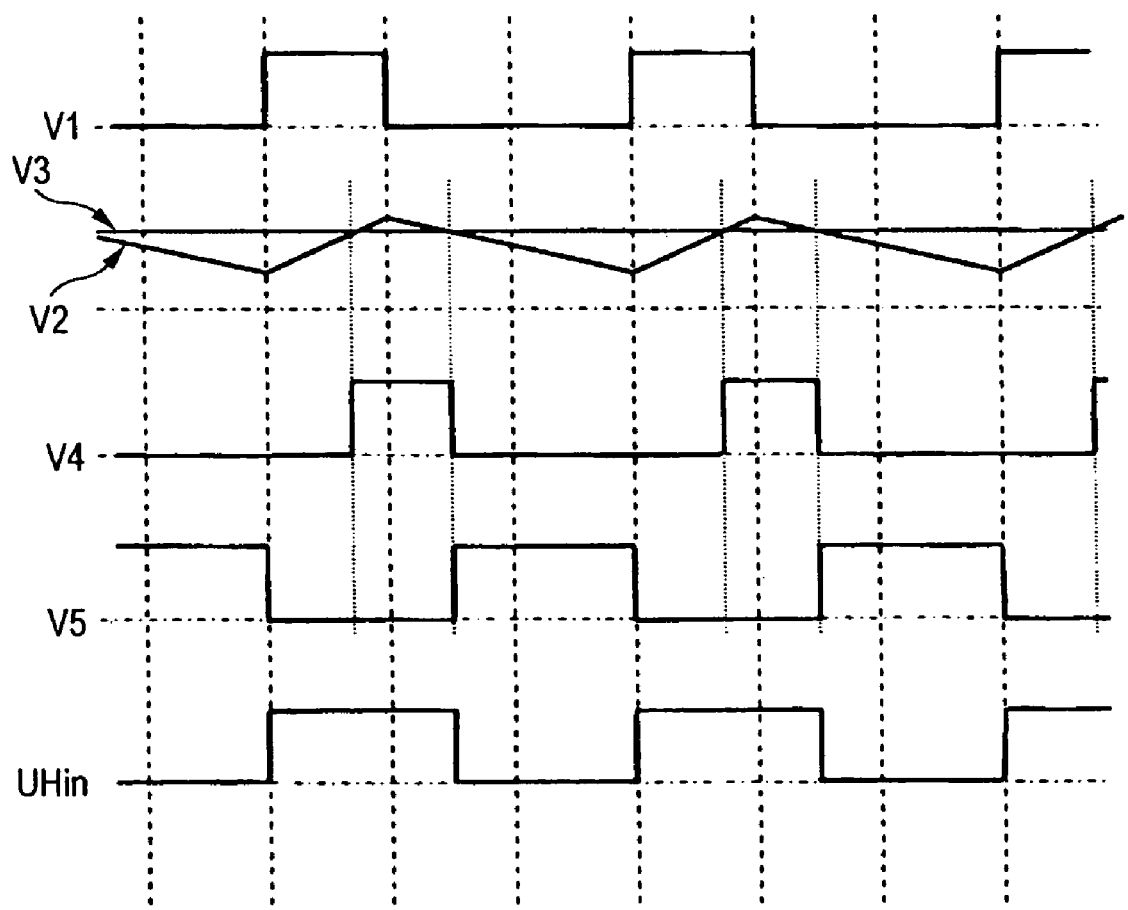
FIG. 7 is a waveform diagram for describing actions of Embodiment 3.

Next, a description is given of actions, particularly, actions in power generation. FIG. 7 shows voltages at respective points in chronological order. Reference numeral V1 denotes output voltages of the comparators CP1 and CP2, V2 denotes a positive input voltage of the comparator CP203, V3 denotes a negative input voltage of the comparator CP203, V4 denotes an output voltage of the comparator CP203, V5 denotes an output voltage of the NOR circuit IC201, and UHin denotes an input voltage of the driver circuit UGateC_h.

The voltage V1 becomes a HIGH voltage for the period of one-third cycle of a current after the diode UDh is made conductive as described above. The voltage V2 is entered into such a waveform as obtained by rise and fall of the voltage V1 becoming dull due to influences of the resistor R215 and capacitor C201 as shown in FIG. 7. The voltage V3 is the reference voltage, wherein the voltages V2 and V3 are compared with each other by the comparator CP203, a voltage waveform V4 can be obtained as illustrated in the drawing. The output V5 of the NOR circuit IC201 into which the voltages V1 and V4 are inputted has such a waveform that it falls at the same time when the voltage V1 rises and rises at the same time when the voltage V4 falls, delaying from the fall point of the voltage V1. By inputting the voltage V5 into the gate of the switch Sw202, a reversal signal of the signal is inputted into the input UHin of the driver circuit UGateC_h.

As a result, the ON period of the power MOSFET FETh is made longer than in Embodiments 1 and 2. The heat generation of elements can be further suppressed. Actions for making invalid the synchronization rectification signal generating circuit when the motor drives are the same as in the preceding embodiments.

Figure 8:
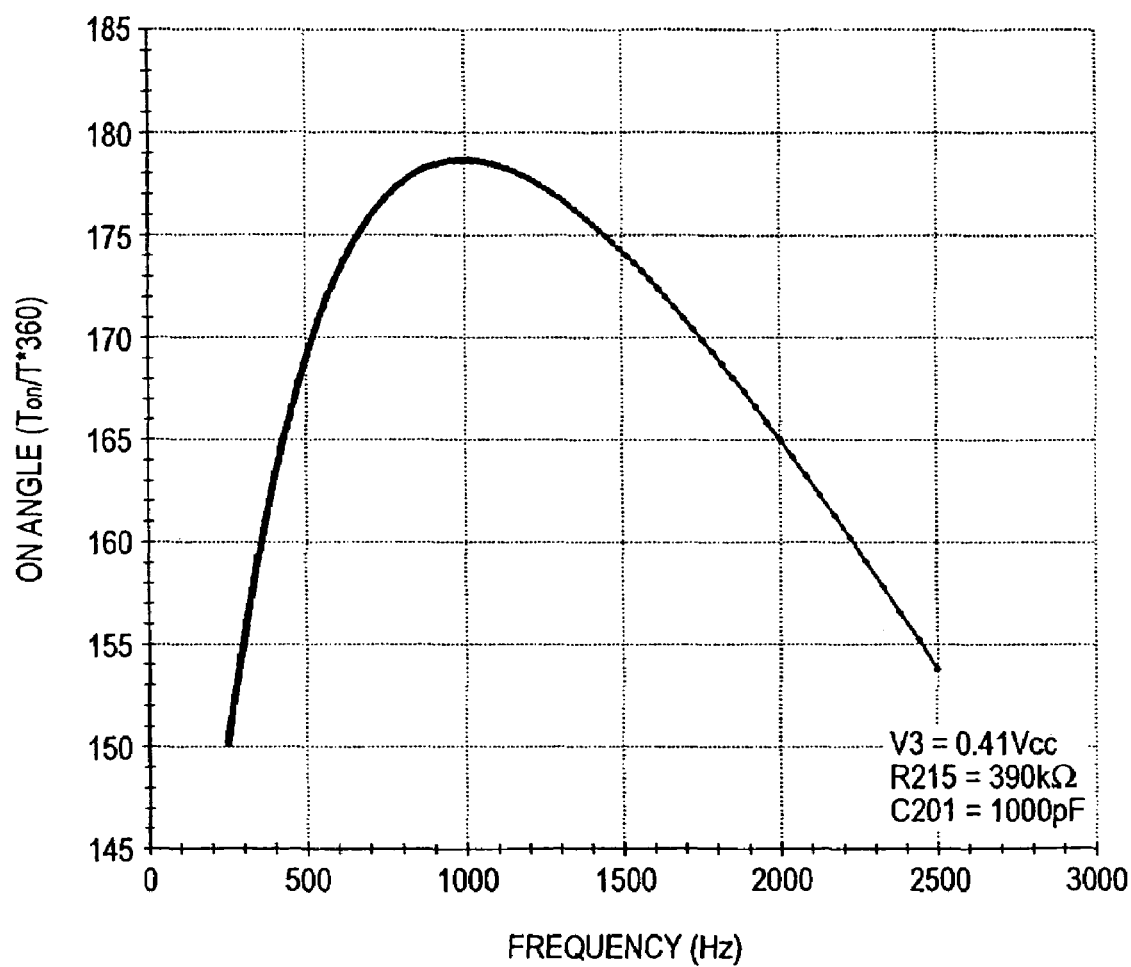
FIG. 8 is a view showing a relationship between ON angles and frequencies.

Herein, the relationship between the frequency of the three-phase AC current and the ON angle is shown in the case where it is assumed that R215 is 390 kΩ, C201 is 1000 pF, and voltage V3 is Vcc×0.41. The ON angle is a value obtained by multiplying the ratio of the ON time of the power MOSFET with respect to one cycle of current by 360 degrees. FIG. 8 shows the result. It is understood that the value becomes 150 degrees through 179 degrees in the power generation current frequency assumed in the present power controlling apparatus. In Embodiments 1 and 2, since the ON angle was 120 degrees, it is understood that the ON period was increased by 1.25 times or more. If the ON angle exceeds 180 degrees, the power MOSFETs at the high-potential side and low-potential side are entered into a simultaneous ON-state, and the generation power is lowered. Therefore, it is necessary that the ON angle is set to 180 degrees or less.

This is the same in the construction and actions at the low-potential side and in the other phases.

As described above, since Embodiment 3 is provided with means for delaying the timing, on which the switching element of the corresponding phase is turned off, by a prescribed period of time within the continuity period of a diode in the corresponding phase, it is possible to further suppress generation losses and heat generation of the elements.

Also, a description is given of the delaying means referred to therein with reference to FIG. 6. The delaying means is composed of a CR circuit consisting of a resistor R215 and a capacitor C201, for making the waveform of voltage V1 dull, a reference signal generating circuit consisting of resistors R217 and R218, a comparator CP203 for comparing the output V2 of the CR circuit with the output V3 of the reference signal generating circuit, and a NOR circuit IC201 for outputting NOR of the voltage V1 and output V4 of the comparator CP203.

Embodiment 4

Figure 9:
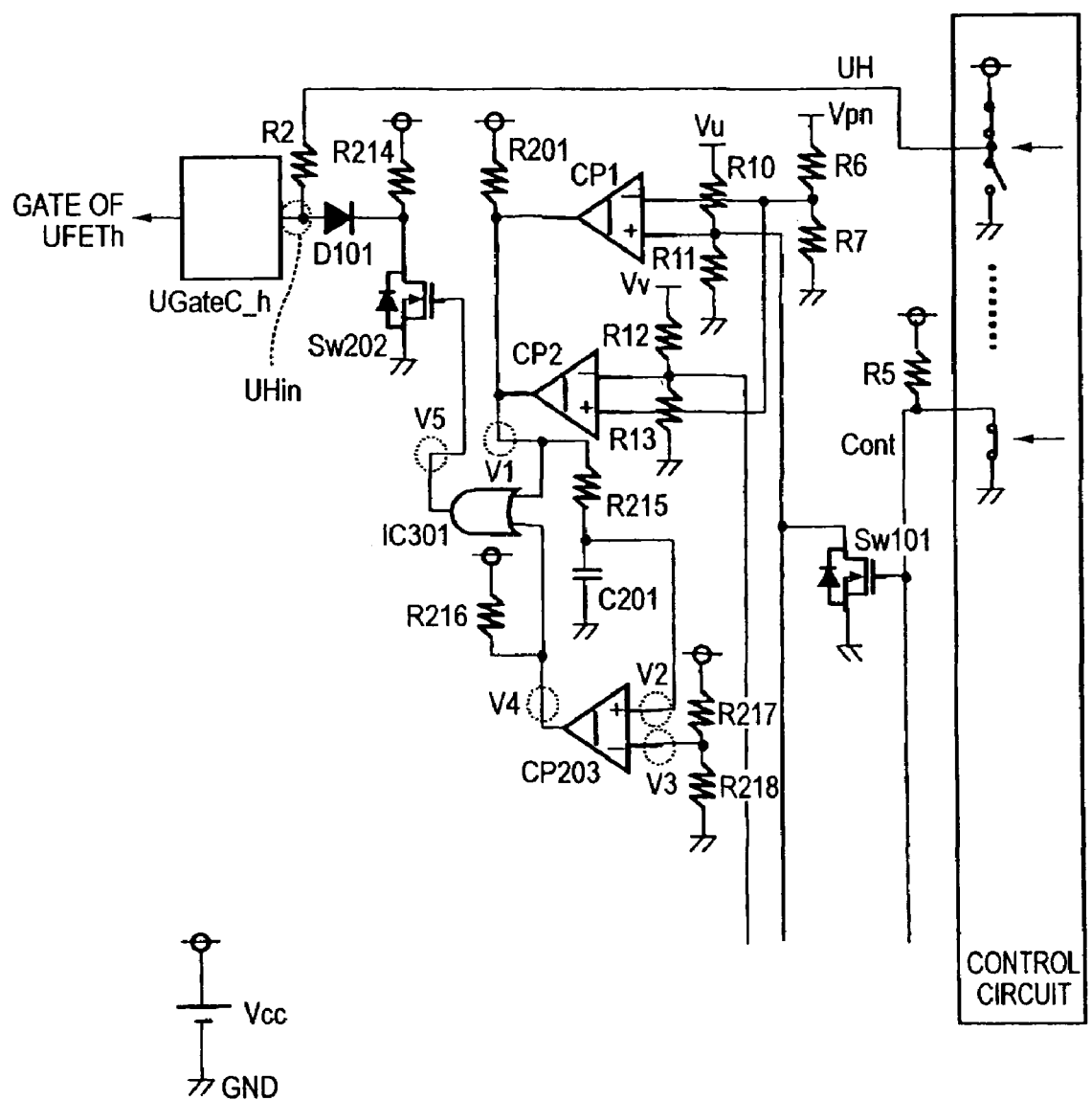
FIG. 9 is a view showing a synchronization rectification signal generating circuit of a power controlling apparatus according to Embodiment 4 of the invention, with a part thereof omitted.

In the preceding Embodiment 3, a description was given of a circuit configuration in the case where the input of the driver circuit is HIGH ACTIVE (HIGH voltage is supplied to the gate of the power MOSFET with a HIGH voltage). In Embodiment 4, a description is given of a circuit configuration in a case where the input of the driver circuit is LOW ACTIVE (HIGH voltage is supplied to the gate of the power MOSFET with a LOW voltage) FIG. 9 shows the high-potential side of the U-phase. Even if the input of the driver circuit is LOW ACTIVE, it is a matter of course that the low-potential side and the other phases have the same construction.

In FIG. 9, the connections of the switch Sw101, a switch (not illustrated) for making invalid the low-potential side synchronization rectification signal generating circuit, and diode D101 are the same as in Embodiment 2. The same portions as those in Embodiment 2 and portions other than an OR circuit IC301 are the same as those in Embodiment 3. As for the actions, the output V5 of the OR circuit IC301 becomes a reversal signal of Embodiment 3, and the signal of UHin becomes a reversal signal. As a matter of course, the effects are the same as those in Embodiment 3.

Embodiment 5

Figure 10:
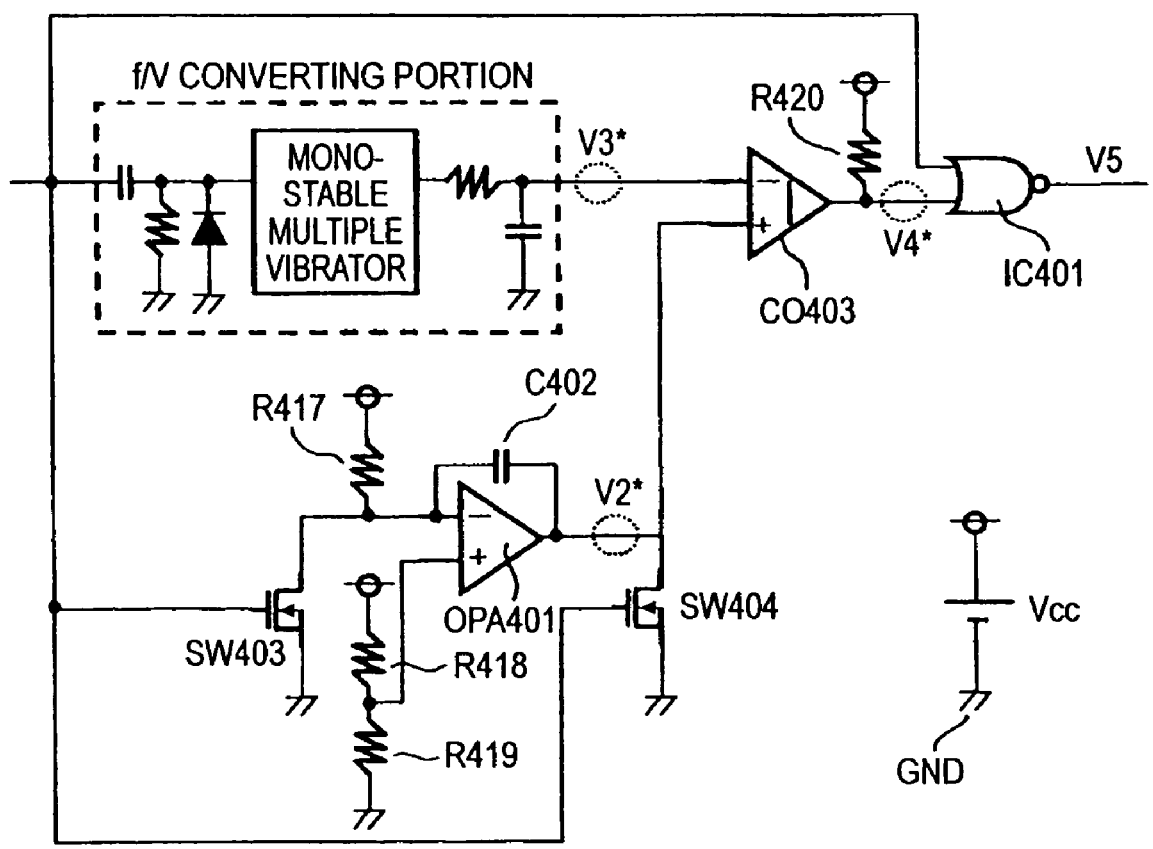
FIG. 10 is a view showing a main part of the synchronization rectification signal generating circuit of a power controlling apparatus according to Embodiment 5 of the invention.

In the preceding Embodiments 3 and 4, a description was given of a system in which the ON angle of the power MOSFET becomes 150 degrees through 179 degrees. With Embodiment 5, it is possible to always set the ON angle to a value which is slightly less than 180 degrees even if the power generation current is in any frequency. FIG. 10 shows a part of the circuit configuration of Embodiment 5. The configuration is such that the circuit disposed between the points of signals V1 and V5 of Embodiment 3 shown in FIG. 6 is replaced by the circuit shown in FIG. 10.

Signal V1 is connected to the input terminal of an f/V converting portion, input terminal of the NOR circuit IC401, and gates of the switch Sw403 (MOSFET) and switch Sw404 (MOSFET). The source of the switch Sw403 is connected to the GND. The drain thereof is connected to the negative input terminal of an operational amplifier OPA401, and is further connected to the power source Vcc via a resistor R417. Voltage obtained by dividing the voltage Vcc by resistors R418 and R419 is inputted into the positive input terminal of the operation amplifier OPA401, and the negative input terminal is connected to the output terminal via a capacitor C402.

The output (V2*) of the operational amplifier OPA401 is connected to the drain of the switch Sw404 and the positive input terminal of the comparator CP403. The source of the switch Sw404 is connected to the GND. The output terminal (V3*) of the f/V converting portion is connected to the negative input terminal of the comparator CP403, and output terminal of the comparator CP403 is connected to the power source Vcc via the resistor R420 and is connected to another input terminal of the NOR circuit IC401. An output signal of the NOR circuit IC401 becomes a signal V5.

The above-described f/V converting portion is a frequency/voltage converting circuit portion, which is composed of a monostable multiple vibrator, resistor and capacitor, etc. In any frequency at the rise of the signal V1, a signal having a fixed pulse width is formed by using the monostable multiple vibrator, and frequency/voltage conversion is carried out by smoothing the signal. In order to form a signal which is attenuated at a fixed inclination, an integration circuit is formed by using the operational amplifier OPA401.

Figure 11:
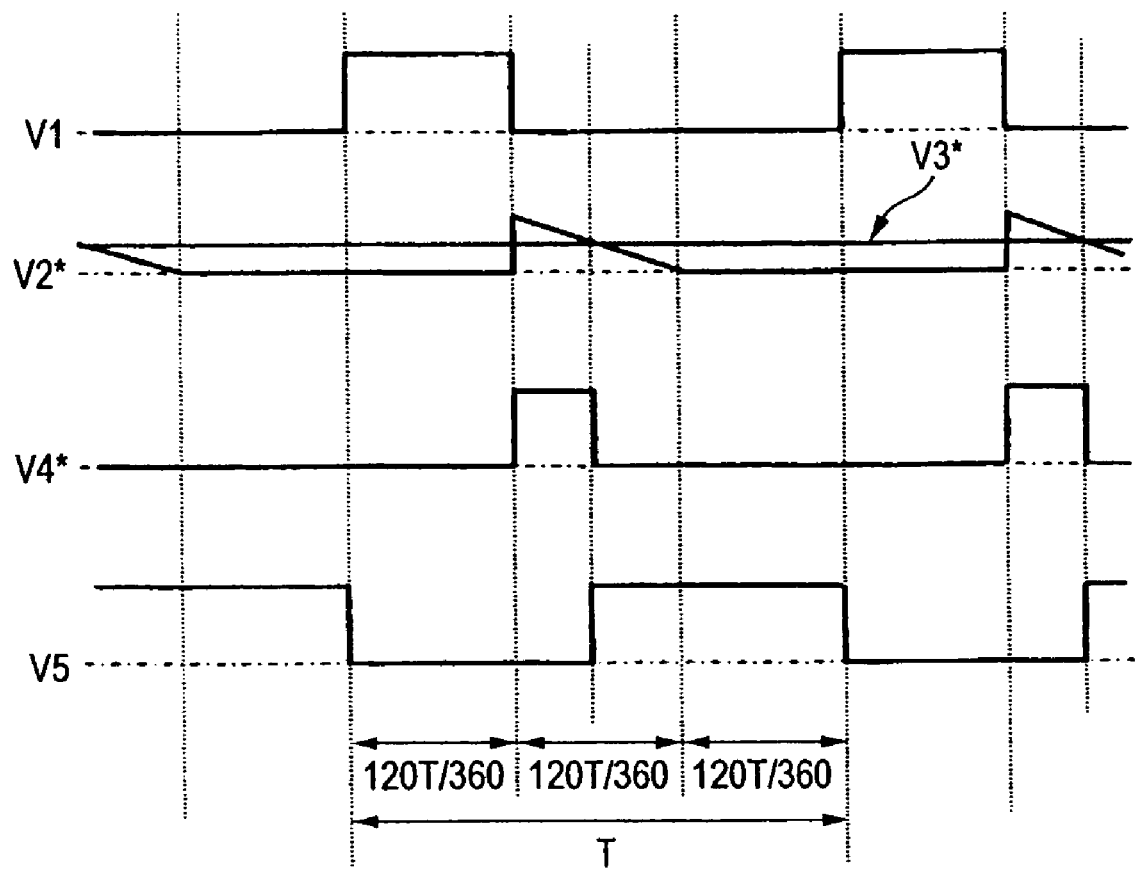
FIG. 11 is a waveform diagram for describing actions of Embodiment 5.

Next, a description is given of actions, in particular, actions in power generation. FIG. 11 shows voltage waveforms at respective voltage points. As described above, the voltage V1 is a rectangular waveform whose ON angle is 120 degrees. The voltage V2* is an output voltage of the operational amplifier OPA401. Since the switch Sw404 is in an ON state for the period of time during which the voltage V1 is HIGH, the voltage V2* is made into GND voltage. If the voltage V1 becomes LOW, the switches Sw403 and Sw404 are turned off, and the voltage V2* rises to Vcc× R419/(R418+R419) instantaneously, and is lowered at a fixed inclination as shown in the drawing. The voltage V2* does not become lower than the GND voltage on the basis of the effects of the parasitic diode of the switch Sw404 and the negative voltage input of the operation power source of the operational amplifier OPA401 being the GND voltage.

On the other hand, as described above, as for the voltage V3*, the voltage value changes, depending on the frequency of the rectangular pulse voltage V1. Where the frequency is low and the cycle is long, the voltage V3* becomes a low voltage, and where the frequency is high and the cycle is short, the voltage V3* becomes a HIGH voltage. By comparing the voltages V2* and V3* with each other by means of the comparator CP403, the fall time of the voltage V1 is coincident with the rise time thereof, wherein a rectangular voltage V4 having a pulse width depending on the frequency is obtained. The pulse width of the voltage V4* is made longer as the frequency of the voltage V1 is lowered, and it is made shorter as the frequency is increased.

By inputting the voltage V4* and V1 into the NOR circuit IC401, a signal V5 is formed, and the signal V5 is inputted into the gate of the switch Sw202 shown in FIG. 6, wherein a gate drive signal of the power MOSFET is formed.

With the present system, it is possible to set the ON angle to a slightly lower value than 180 degrees at all times within 250 Hz through 2.5 kHz by setting a constant of the f/V converting circuit and a constant of voltage inclination of the voltage V2*. According to the present Embodiment 5, it is possible to further lower the heat generation in power generation operations.

The construction and actions of the low-potential side and in the other phases are the same as the above description.

As described above, by causing the delay time delayed by the delaying means to be changed in response to the frequency of the AC circuit, the continuity period expressed in terms of a phase angle of switching elements becomes constant. Therefore, even if the frequency changes, generation losses and heat generation of the elements can be ultimately lowered.

Also, in Embodiment 5, a description was given of a circuit configuration in which the input of the driver circuit is HIGH ACTIVE. However, if the NOR logic circuit IC401 is replaced by an OR logic circuit as in the preceding Embodiment 4 (FIG. 9), and the circuit configuration of the input portion of the driver circuit is constructed as in FIG. 9, actions are enabled even where the input of the driver circuit is LOW ACTIVE. Also, the construction and actions at the low-potential side and of the other phases are the same as in the above description.

Embodiment 6

Figure 12:
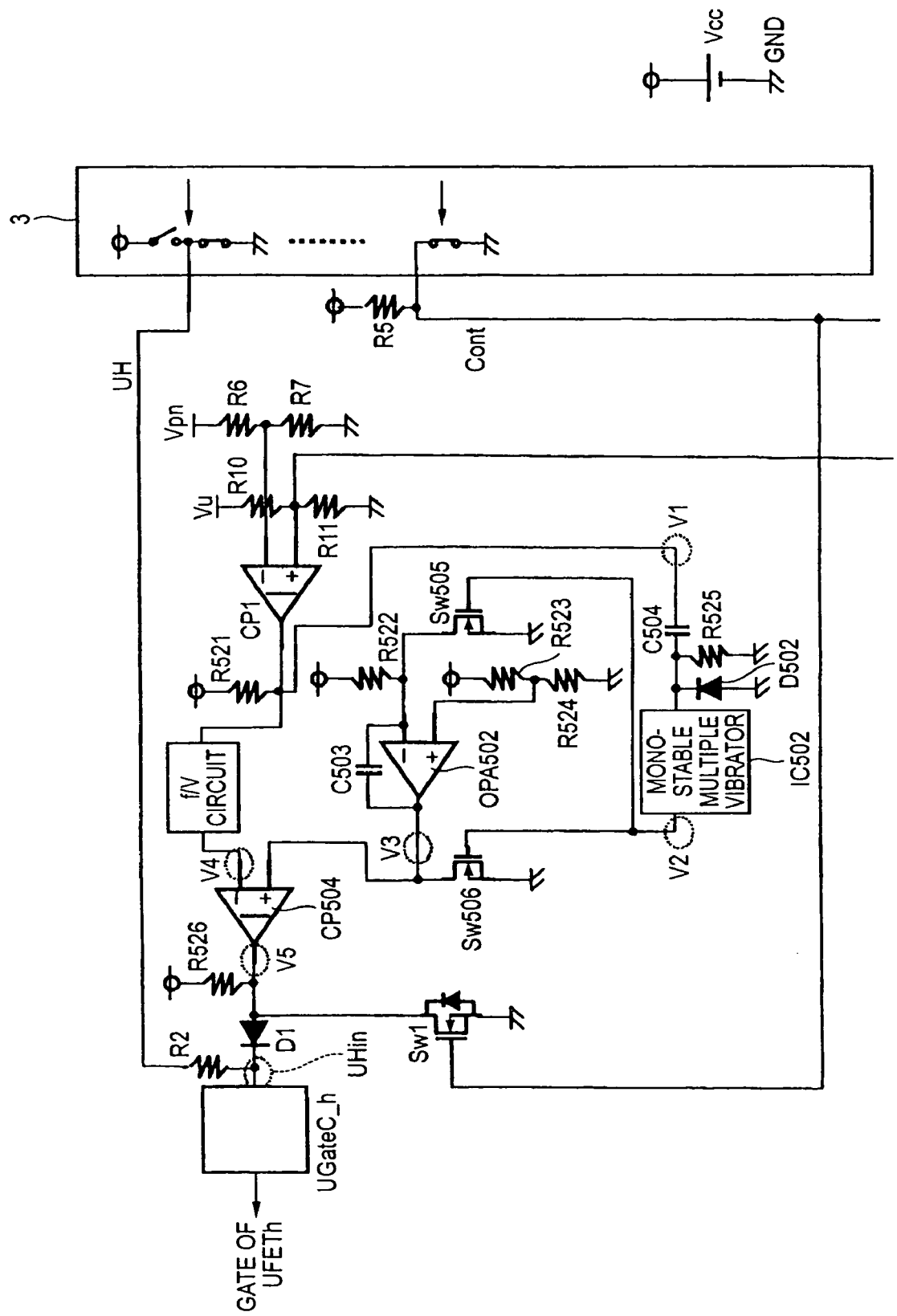
FIG. 12 is a view showing a synchronization rectification signal generating circuit of a power controlling apparatus according to Embodiment 6 of the invention, with a part thereof omitted.

In Embodiment 5, a description was given of a system in which it is possible to set the ON angle to a slightly lower value than 180 degrees in any frequency of power generation at all times. Embodiment 6 shows another construction by which it is possible to set the ON angle to a slightly lower value than 180 degrees at all times. FIG. 12 shows a circuit configuration at the U-phase high-potential side of a synchronization rectification signal according to Embodiment 6.

Connections of the driver circuit UGateC_h, resistor R2, diode D1, UH terminal of the controlling circuit 3, Cont terminal, switch Sw1, and resistor R5, and connections of the comparator CP1, resistors R6, R7, R10 and R11 are the same as those in Embodiment 1 (FIG. 2).

The output (V1) of the comparator CP1 is connected to the power source Vcc via the resistor R521, to the input of the f/V converting circuit, and terminal of the capacitor C504. Another terminal of the capacitor C504 is connected to the resistor R525, cathode of the diode D502, and the input terminal of the monostable multiple vibrator IC502. The anodes of the resistor R525 and diode D502 are connected to the GND.

The output (V2) terminal of the monostable multiple vibrator IC502 is connected to the gates of the switch Sw505 (MOSFET) and the switch Sw506 (MOSFET). The source of the switch Sw505 is connected to the GND, and the drain thereof is connected to the negative input terminal of the operation amplifier OPA502 and is also connected to the resistor R522 via the power source Vcc. Voltage obtained by dividing the voltage Vcc by the resistors R523 and R524 is inputted into the positive input terminal of the operation amplifier OPA502, and the negative input terminal is connected to the output terminal via the capacitor C503. The source of the switch Sw506 is connected to the GND, and the drain thereof is connected to the output (V3) terminal of the operational amplifier OPA502 and the positive input terminal of the comparator CP504. The negative input terminal of the comparator CP504 is connected to the output (V4) terminal of the f/V converting circuit, and the output (V5) terminal is connected to the anode of the diode D1 and to the power source Vcc via the resistor R526.

The above-described f/V converting portion is a frequency/voltage converting circuit portion, which is the same as that described in the preceding Embodiment 5. Also, in order to form a signal which is attenuated at a fixed inclination, an integration circuit is composed by using an operational amplifier OPA502.

Figure 13:
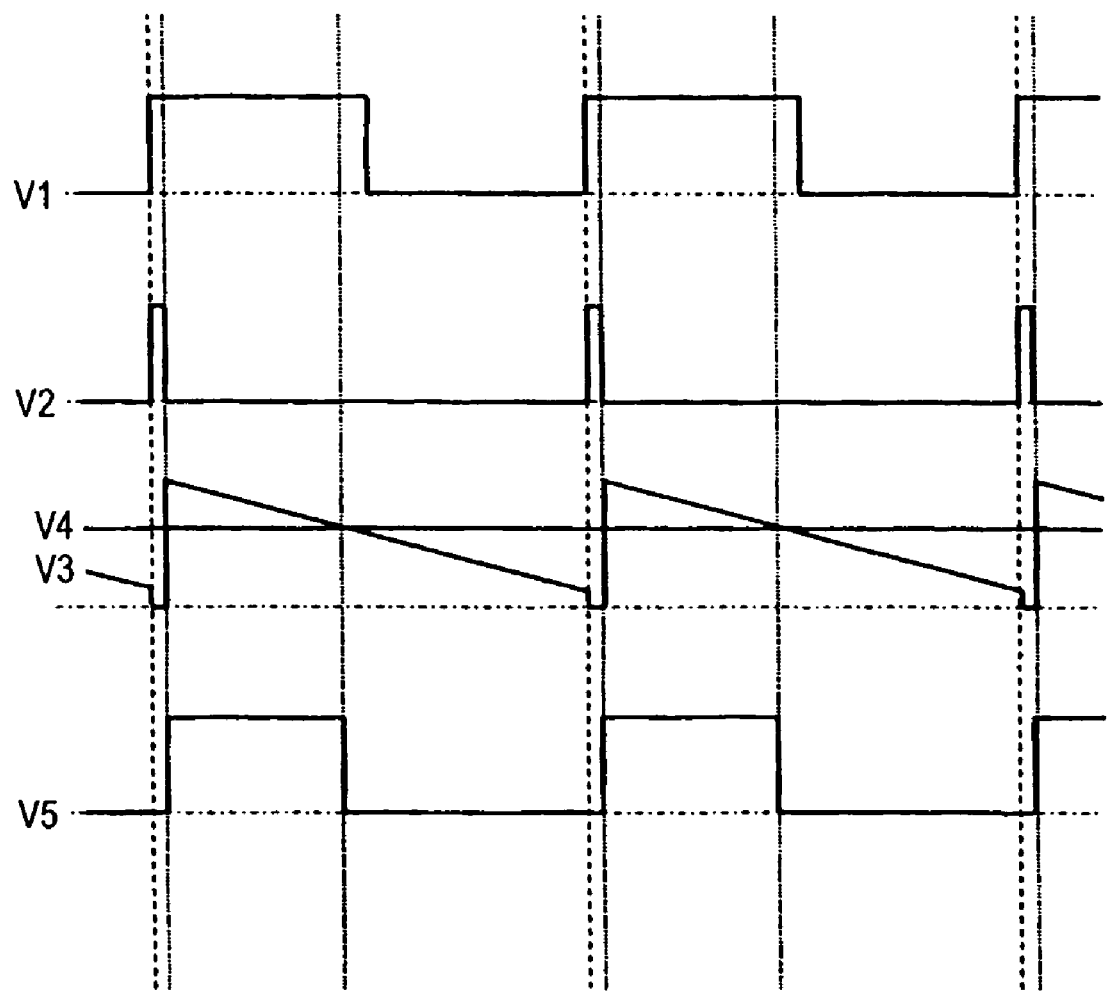
FIG. 13 is a waveform diagram for describing actions of Embodiment 6.

Next, a description is given of actions, in particular, power generation actions. FIG. 13 shows voltage waveforms at respective voltage points. Based on a function of the comparator CP1, it is possible to obtain a signal V1 in which continuity commencement of the main circuit diode UDh is agreed with the rise timing. Utilizing the rise of the voltage V1, a signal V2 having a fixed pulse width not depending on the motor current frequency can be obtained. A signal V3 is formed by resetting the integration circuit composed of the operational amplifier OPA502 by the signal V2 every time. By comparing the DC voltage (signal) V4 formed by the f/V converting circuit with the signal V3 by means of the comparator CP504, a gate drive signal of a power MOSFET whose ON angle is slightly lower than 180 degrees is formed.

This is the same with respect to the construction and actions at the low-potential side and in the other phases.

As described above, Embodiment 6 according to the invention is provided with ON-time setting means for turning off a switching element after a prescribed period of time established within the continuity period of a diode connected to the corresponding switching element in parallel thereto after the switching element is turned on. By varying the ON-time set by the ON-time setting means in accordance with the frequency of an AC circuit, the continuity period expressed in terms of a phase angle of a switching element is made constant regardless of the frequency. Therefore, the circuit for detecting voltage can be simplified, and at the same time, even if the frequency changes, generation losses of elements and heat generation can be reduced to the minimum.

In Embodiment 6, a description was given of a circuit configuration in which the input of a driver circuit is HIGH ACTIVE. As in Embodiment 2 (FIG. 5), if the output signal of the comparator CP1 is logically reversed, the operation is enabled if the input of the driver circuit is LOW ACTIVE. In addition, this is the same with respect to the construction and actions at the low-potential side and in the other phases.

Figure 14:
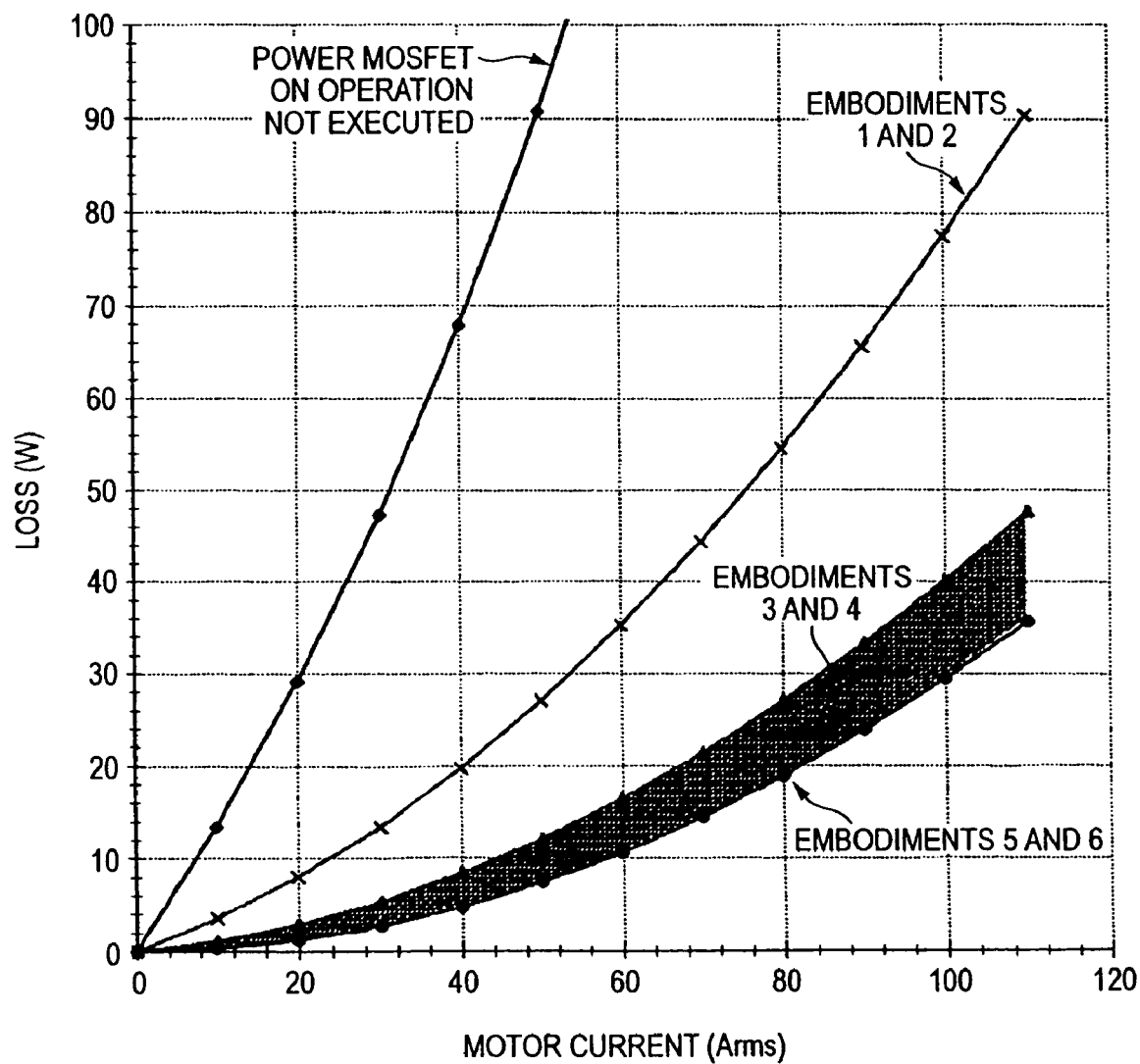
FIG. 14 is a view showing effects (reduction in losses of elements) of the invention in the respective embodiments of the invention.

Finally, a description is given of effects of the invention. FIG. 14 shows one example of the relationships between the motor current (current flowing in the U, V and W phases) and the heat generation amount of all the elements in a case where the power MOSFET is not turned on when a diode is made conductive, in a case of Embodiments 1 and 2, in a case of Embodiments 3 and 4, and in a case of Embodiment 5 and 6. Based on the drawing, it is understood that, with the present invention, heat generation of the apparatus can be suppressed to a large extent. Among the cases, the reason why there is a range in the characteristics in Embodiments 3 and 4 is based on that the ON angle changes in compliance with the frequency (See FIG. 8).

Also, in the above description, although a MOSFET is used as a switching element, the switching element is not limited to the MOSFET and other types of elements may be used if it is a switching element by which power supply is bidirectionally available, so that both an inverter action for carrying out motor drive and an action for reducing a current flowing in a diode with power supplied in the same direction as that of a diode connected in parallel in power generation rectification is applied.

What is claimed is:

1. A power controlling apparatus comprising a power converting circuit which is connected between a DC circuit and an AC circuit, the power converting circuit comprising a switching element enabling bidirectional power supply and a diode connected in parallel to the switching element, the power converting circuit executing an inverter operation which, by controlling the switching element, converts DC power from the DC circuit to AC power that is outputted to the AC circuit and a rectification operation which, by the diode, converts AC power from the AC circuit to DC power that is outputted to the DC circuit, wherein the switching element connected in parallel to the diode is caused to supply power in a same direction as the diode in a period of time of power supply made by the diode in the rectification operation.

2. A power controlling apparatus according to claim 1, wherein the power converting circuit is a three-phase power converting circuit comprising a high-potential side switching circuit and a low-potential side switching circuit which are connected in series, each of the high-potential side switching circuit and the low-potential side switching circuit comprising a parallel connector of the switching element and diode, the three-phase power converting circuit is connected in three phases between a high-potential side terminal and a low-potential side terminal of the DC circuit, and respective series connection points of the high-potential side and low-potential side switching circuits are connected to respective phase terminals of the three-phase AC circuit.

3. A power controlling apparatus according to claim 2, further comprising first detecting means for detecting voltage of respective phases of the three-phase AC circuit and voltage of the DC circuit and for detecting power supply commencement timing of the respective diodes through comparison operations on the basis of the voltage detection values, wherein the switching element connected to the corresponding diodes in parallel thereto is turned on with the power supply commencement timing detected by the first detecting means.

4. A power controlling apparatus according to claim 3, further comprising second detecting means for detecting voltage of a next phase delayed by a $(\frac{2}{3})\pi$ it phase angle from a corresponding phase on which the switching element has been turned on and voltage of the DC circuit, and for detecting power supply commencement timing of the next phase diode through comparison operations on the basis of these voltage detection values, wherein the corresponding diode switching element is turned off with the power supply commencement timing detected by the second detecting means.

5. A power controlling apparatus according to claim 4, further comprising delaying means for delaying the timing of turning off the corresponding phase switching element by a prescribed duration of time in the power supply period of the corresponding phase diode.

6. A power controlling apparatus according to claim 5, wherein, by varying the delay time for delaying by the delaying means in accordance with the frequency of the AC circuit, the power supply period expressed in terms of a phase angle of the switching element is made constant regardless of the frequency.

7. A power controlling apparatus according to claim 3, further comprising ON time setting means for turning off the switching element in a prescribed ON-time that is set in the power supply period of a diode connected to the corresponding switching element in parallel thereto after turning on the corresponding switching element, wherein, by varying the ON-time set by the ON-time setting means in accordance with the frequency of the AC circuit, the power supply period expressed in terms of a phase angle of the switching element is made constant regardless of the frequency.

8. A power controlling apparatus according to any one of claims 1 through 7, wherein the DC circuit includes a DC power source that can be charged and discharged, and the AC circuit includes a generator/motor which converts mechanical power to AC power and AC power to mechanical power.

9. A power controlling apparatus according to any one of claims 1 through 8, wherein the switching element is a metal oxide semiconductor field effect transistor (MOSFET).

10. A power controlling apparatus according to claim 9, wherein the diode is a parasitic diode of the MOSFET.

* * * * *